Aug. 21, 1951   J. M. BRADY   2,564,669
PRESSURE MEASURING DEVICE
Filed Nov. 13, 1945
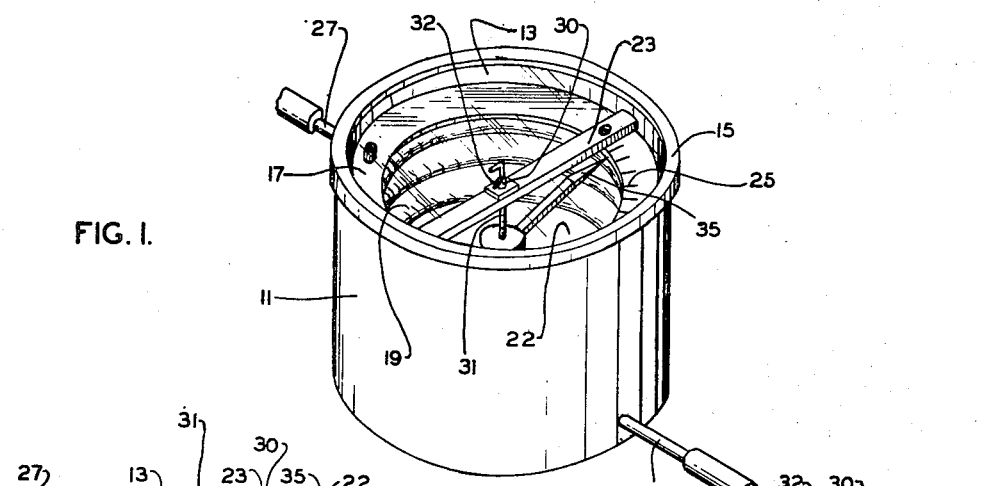
FIG. I.
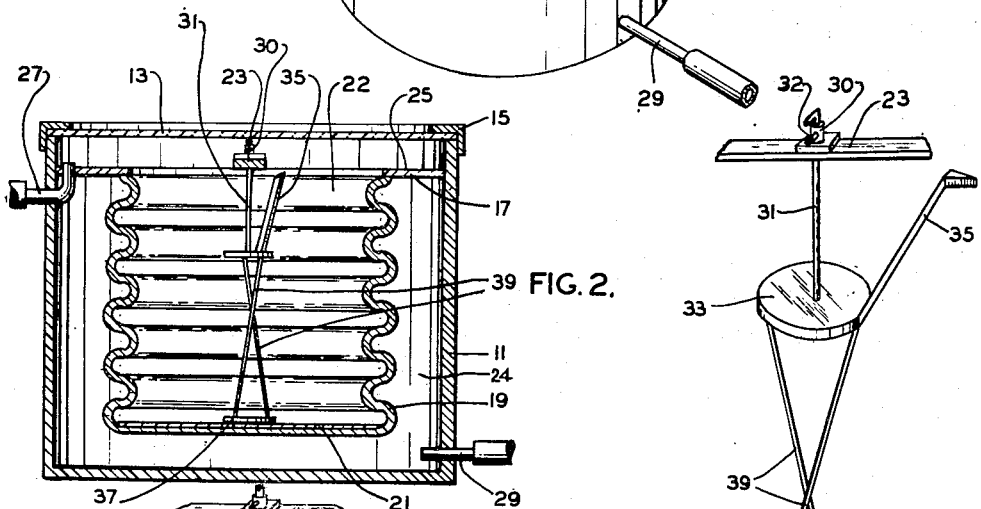
FIG. 2.
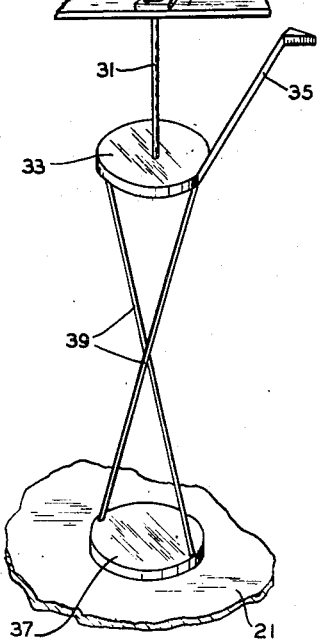
FIG. 3
FIG. 4.
FIG. 5.
INVENTOR.
JAMES M. BRADY
BY
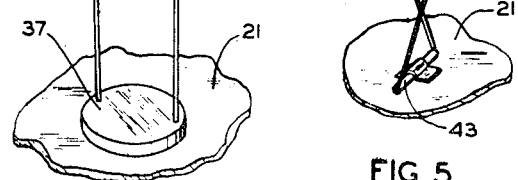
Attorney Patented Aug. 21, 1951

2,564,669

UNITED STATES PATENT OFFICE 2,564,669

PRESSURE MEASURING DEVICE

James M. Brady, West Long Branch, N. J.

Application November 13, 1945, Serial No. 628,340

17 Claims. (Cl. 73—407)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to measuring devices.

In various types of measuring apparatus, and particularly in meteorological instruments, the problem of measuring relatively small quantities with suitable accuracy frequently arises. This is notably acute, for instance, in measuring winds of very low velocity, such as of the order of one and two miles per hour.

It is therefore an object of the present invention to provide a mechanism for accurately measuring small quantities or movements.

It is another object to provide such a mechanism having no linkages to introduce friction which may interfere with the sensitivity of the mechanism and impede its operation.

It is a further object to provide such a device which is well adapted to measuring wind velocities and particularly winds of very low velocities.

It is still another object to provide such a device which is capable of accurately measuring slight pressure differentials.

It is a still further object to provide a type of measuring device or movement which is nonlinear, and which may be modified to give different degrees of nonlinearity.

It is yet another object to provide a measuring device which is most sensitive at the lower end of its scale.

Although the novel features which are characteristic of this invention are pointed out more particularly in the claims appended hereto, the invention may be better understood by referring to the following description in which a specific embodiment thereof is set forth for purposes of illustration.

In general the present invention includes a bifilar system wherein the respective ends of two thread-like elements are maintained in spaced relationship and one end of said system is secured against rotation about the axis of the system but is free to move a limited distance along said axis and the other end thereof is secured against axial movement but is free to rotate about said axis. There is also provided a suitable spring means to urge the rotatable end of the bifilar system into rotation in one sense of direction and maintain a taut relationship between the parts. Relatively small axial movements of one end of the system will cause relatively large rotational movements of the other end of the system.

More specifically, the invention provides a ladder-like structure which may have two or more spacing means, such as rungs. The rung or other spacing means at one end is rotatable about the axis of the ladder-like structure (which is a line bisecting the two rungs) and it is spring urged, as by a torsion wire, to so rotate in one direction. The rung at the other end is free only to move translationally along the axis aforesaid. When the rungs are furthest apart and the bifilar elements assume positions parallel to the axis, or nearly so, the spring means, or torsion wire, is subjected to maximum strain. When the axially movable rung moves toward the rotatable rung, the spring means causes the latter to rotate, thereby causing the bifilar elements to take positions relatively angulated to the axis aforesaid.

The said mechanism, or variations of it, have innumerable applications. As illustrated in the drawings, such a bifilar system may be used to measure wind velocities by securing one end of the system to the diaphragm of a bellows and connecting the pressure outlets of a Pitot or Venturi tube to pressure chambers on opposite sides of said diaphragm. The pressure differential will cause said diaphragm to move axially, thereby imparting rotational movement to the rotatable rung of the bifilar system. A pointer secured to said rotating rung may pass along a suitably calibrated scale.

In the drawings, Figure 1 is a perspective view of a wind velocity meter embodying the present invention, shown when there is no differential pressure and the indicating finger is at its zero position;

Figure 2 is a vertical, cross-sectional, diagrammatic view of the meter of Figure 1;

Figure 3 is an enlarged perspective view, taken from the right side in Figure 2, of the bifilar system of the said meter;

Figure 4 is a view, similar to Figure 3, the parts being shown however in their positions when the indicating finger has moved to its position of maximum indication; and Figure 5 is a view, similar to Figure 4, of a modified bifilar system made up of three ladder-like sections.

Referring now more specifically to the drawings, the illustrated embodiment of the present invention includes a cylindrical cup 11 provided with a transparent window 13 and a suitable bezel 15 which secures said window to said cup in an airtight manner.

An annular plate 17 is secured to the inside of the cup 11 near its top and suspended from the inner periphery of said plate 17 is a suitable pressure responsive bellows 19, provided at its lower end with a stiff, horizontally disposed diaphragm 21. The annular plate 17 is sealed to the cup 11 and to the mouth of the bellows 19 so as to form an airtight high pressure chamber 22 within said bellows and above said plate and an airtight low pressure chamber 24 outside said bellows and below said plate.

Extending through the walls of the cup 11 are a high pressure inlet tube 27, which is connected to the high pressure outlet of a conventional Pitot or Venturi tube (not shown), and a low pressure inlet tube 29, which is connected to the low pressure outlet of said Venturi tube. The high pressure inlet tube 27 is directed into the high pressure chamber 22 and the low pressure tube 29 into the low pressure chamber 24.

Extending diametrically across the annular plate 17, and suitably secured thereto, is a cross bar 23. The upper surface of the plate 17 is provided with suitable scale markings 25 which extend about it in an arc of slightly less than 180°. A collar 30, provided with a set screw 32, is rigidly secured to the cross bar 23 and, extending through said collar and held in place by said set screw, is a short torsion wire 31.

Rigidly secured to the lower end of the torsion wire 31 is a horizontally disposed, disk-shaped, upper rung 33. Extending upwardly and outwardly from one edge of said upper rung 33 is an indicating finger 35, the upper end of which is positioned intimately relative to the scale markings 25. A disk-like lower rung 37 is securely fastened to the diaphragm 21 at a point directly below the upper rung 33. Two diametrically opposite points on the perpihery of the upper rung 33 are coupled to two diametrically opposite points on the periphery of the lower rung 37 by a pair of wires 39, which are the bifilar elements of the device.

In the first three figures, the parts are shown in their inoperative, relaxed positions, as when there is no difference in the pressures within the two chambers 22, 24, and the indicating finger 35 is directed at the scale markings 25 at the lower end of the scale.

However, when the meter is in operation and a greater pressure is directed into the high pressure chamber 22 than into the low pressure chamber 24, the bellows 19 will become elongated whereupon the diaphragm 21 and the lower rung 37 will move downwardly. As the upper rung 33 is prevented from moving downwardly therewith, by the torsion wire 31 to which it is attached, it will be caused to rotate so as to allow the two wires 39 to assume less angulated positions. The wires 39 are kept taut at all times by reason of the fact that the torsion wire 31 is urging the upper rung 33 in the opposite direction of rotation. At the lowermost position of the diaphragm 21, as shown in Figure 4, the wires 39 will be almost vertically disposed and the indicating finger 35 will have swung through an arc of slightly less than 180°, to its position of maximum indication. When the pressures in the two chambers 22, 24 are again equalized, the torsion wire 31 will rotate the upper rung 33 back to its normal "zero" position, as shown in Figures 1, 2 and 3.

The set screw 32 is used to permit adjustment of the torque of the torsion wire 31 and the tension upon the bifilar system.

Thus there is obtained a device to accurately translate the differential pressure between the two pressure outlets of a Pitot or Venturi tube into a wind velocity indication. As the structure incorporates no pivots, gears or contacting surfaces in relative motion with each other, it is capable of accurately indicating extremely small pressure differentials. The movement of the indicating finger 35 is not linear with respect to the movement of the diaphragm 21. This non-linear relationship makes the meter more sensitive at the lower end of the scale. Also said nonlinearity tends to correct the nonlinearity of the pressure-velocity relationship, thus making possible a more linear arrangement of the scale markings 25.

When using a single ladder-like section, as illustrated in Figures 3 and 4, the maximum swing of the indicating finger 35 will be less than 180°. Should a greater swing be desired or should a more linear movement be desired, a plurality of bifilar structures may be coupled together in series. Such a system is shown in Figure 5 where three ladder-like sections are shown. The system is made up of four rod-like rungs, namely the top rung 41, the bottom rung 43 and the two intermediate rungs 45, 45, which are positioned, one above the other in spaced parallel horizontal planes. Their ends are joined by the two wires 47, 47. The top rung 41 is secured to the lower end of a torsion wire 31 and the bottom rung 43 is secured to a diaphragm 21. With this system, a maximum swing through an arc of somewhat less than 540° is possible.

While there has been shown in the drawings and there has been described in detail preferred forms of the invention, it will be understood that it is not thereby intended to limit it to the specific applications disclosed but it is aimed to cover all modifications and alternative constructions falling within the scope of the invention as expressed in the claims. For instance, the bifilar system, including the torsion wire, may be reversed end for end in a particular application. Also, in the illustrated embodiment the bellows may be omitted entirely and a flexible diaphragm substituted.

Again, the two ends of a bifilar system (including one or more ladder-like sections and a torsion wire) might be sustained against both relative axial and relative rotational movements. In such an application, slight variations in the lengths of the torsion wire and/or the threads, which might be caused by changes in physical phenomena, such as temperature or humidity, would cause relatively great rotation of the rung attached to the inner end of the torsion wire and carrying an indicating finger, so as to give an indication of temperature or humidity. To measure temperature, the torsion wire and threads could both be of metal. For humidity measurement, threads of suitable fiber could be substituted.

What is claimed is:

1. In a movement translating device, two rungs positioned in spaced substantially parallel planes and so that their midpoints are both intersected by an axis which is substantially normal to said planes, two threads extending from the ends respectively of one rung to the ends respectively of the other rung, means to prevent the first rung from rotating about the said axis but allowing it to move along the axis aforesaid, frictionless means to prevent the second rung from moving axially but allowing it to rotate about said axis, and frictionless means to urge the second rung into rotational movement about the said axis.

2. In a movement translating device, two rungs positioned in spaced substantially parallel planes and so that their midpoints are both intersected by an axis which is substantially normal to said planes, two threads extending from the ends respectively of one rung to the ends respectively of the other rung, means to prevent the first rung from rotating about the said axis but allowing it to move along the axis aforesaid, frictionless means to prevent the second rung from moving axially but allowing it to rotate about said axis, and a torsion wire extending axially from the midpoint of the second rung aforesaid in a direction away from the first rung to urge said second rung into rotational movement about said axis.

3. In a movement translating device, two rungs positioned in spaced substantially parallel planes and so that their midpoints are both intersected by an axis which is substantially normal to said planes, two threads extending from the ends respectively of one rung to the ends respectively of the other rung, means to prevent the first rung from rotating about the said axis but allowing it to move along the axis aforesaid, and frictionless means to prevent the second rung from moving axially but allowing it to rotate about said axis.

4. In a movement translating device, a torsion wire, means to secure one end thereof against both rotational and axial movement, a first rung secured at its midpoint to the other end of said torsion wire and substantially normal thereto, a second rung disposed so that it is at all times in a plane substantially normal to the axis aforesaid and with its midpoint intersected by said axis, two threads of substantially equal length joining the two ends respectively of the first rung to the two ends respectively of the second rung, means to prevent said second rung from rotating about the axis aforesaid, and means to urge the second rung along the axis aforesaid.

5. In a mechanical movement device for translating between linear and rotary movements, a ladder-like system made up of two rungs and two threads, joined alternately to one another at their ends to form the four links of a chain-like framework, said rungs being disposed in spaced substantially parallel planes and the midpoints of both rungs being intersected by a single axis substantially normal to said planes, and frictionless means to urge one of said rungs rotationally about the axis aforesaid in one direction.

6. In a mechanical movement device for translating between linear and rotary movements, a ladder-like system made up of two rungs and two threads joined alternately to one another at their ends to form the four links of a chain-like framework, the joints between said rungs and threads being rigid, the threads being of flexible material, the rungs being of stiff material and disposed in spaced substantially parallel planes and the midpoints of both rungs being intersected by a single axis substantially normal to said planes, and frictionless means to urge one of said rungs rotationally about the axis aforesaid in one direction.

7. In a mechanical movement device for translating between linear and rotary movements, a ladder-like system made up of two rungs and two threads joined alternately to one another at their ends to form the four links of a chain-like framework, said rungs being disposed in spaced substantially parallel planes and the midpoints of both rungs being intersected by a single axis substantially normal to said planes, means to move one of said rungs along said axis in one direction, spring means to resist such movement, and frictionless means to urge the other rung rotationally about the axis aforesaid in one direction.

8. The combination of a ladder-like section comprising two stiff rungs and two flexible threads spanning the opposite ends of said rungs, said rungs being movable relative to each other along an axis intersecting their midpoints and being rotatable relative to each other about said axis, frictionless means to urge one of said rungs rotationally in one direction relative to the other.

9. The combination set forth in claim 8 above, wherein said last mentioned means comprises a torsion wire secured to the midpoint of said last mentioned rung and extending along the axis mentioned in said claim.

10. The combination as set forth in claim 8, wherein said last mentioned means comprises a torsion wire secured to the midpoint of said last mentioned rung and extending along the axis mentioned in said claim, and wherein there are also means to urge said rungs further apart along said axis relative to each other and to assist in maintaining tension upon said threads.

11. The combination of a ladder-like structure comprising a plurality of equally spaced rungs and two flexible threads joining the opposite ends of all of said rungs, said rungs being movable relative to each other along an axis intersecting their midpoints and being rotatable relative to each other about said axis, and frictionless means to urge the rung at one end of said structure rotationally relative to the other rungs.

12. The combination of a ladder-like structure comprising a plurality of spaced rungs and two flexible threads joining the opposite ends respectively of all of said rungs, said rungs being movable relative to each other along an axis intersecting their midpoints and being rotatable relative to each other about said axis, frictionless means to urge the rung at one end of said structure rotationally relative to the other rungs, and frictionless means to urge the rungs further apart along the said axis relative to each other and to assist in maintaining tension upon the threads.

13. In a differential pressure responsive device, a pressure responsive diaphragm, a rung disposed with its midpoint intersected by the axis of said diaphragm and movable rotationally about said axis and in a plane substantially normal to said axis and spaced from said diaphragm, a torsion wire fastened at one end to the midpoint of said rung and extending axially away from said diaphragm, two threads respectively extending from two points on the rung equidistant from the axis to two points on the diaphragm equidistant from the axis, said diaphragm being nonrotatable about the said axis but movable axially upon being subjected to different pressures on its opposite sides, and means to secure the other end of said torsion wire against axial or rotational movement.

14. In a differential pressure responsive device, a pressure responsive diaphragm, a rung disposed with its midpoint intersected by the axis of said diaphragm and movable rotationally about said axis and in a plane substantially normal thereto, a torsion wire fastened at one end to the midpoint of said rung and extending axially away from said diaphragm, two threads respectively extending from two points on the rung equal distance from the axis to two points on the diaphragm equal distance from the axis, said diaphragm being nonrotatable about the said axis but movable axially upon being subjected to different pressures on its opposite sides, means to secure the other end of said torsion wire against axial or rotational movement, and means to apply torque to said torsion wire and to apply tension to said torsion wire and said threads.

15. A differential pressure responsive device as defined in claim 14, wherein the last mentioned means are adjustable.

16. A differential pressure responsive device as defined in claim 14, including means to urge the diaphragm axially in one direction.

17. In a differential pressure meter, a horizontally disposed diaphragm vertically movable in response to different pressures above and below it, pressure chambers above and below said diaphragm, a vertically disposed torsion wire within the upper pressure chamber and coaxial with the diaphragm, its upper end being rigidly secured against rotational or axial movements, a horizontally disposed rung secured at its midpoint to the lower end of the torsion wire, two threads secured to the opposite ends of the rung and extending down to and secured to the diaphragm, and indicating means actuated by rotational movements of the rung.

JAMES M. BRADY.

REFERENCES CITED

The following references are of record in the file of this patent:

UNITED STATES PATENTS

| Number | Name | Date |
|---|---|---|
| 31,522 | Andress | Feb. 21, 1861 |
| 358,728 | Campbell | Mar. 1, 1887 |
| 1,287,860 | Bristol et al. | Dec. 17, 1918 |
| 1,761,489 | Paulin | June 3, 1930 |
| 1,818,169 | Stalder | Aug. 11, 1931 |
| 1,993,441 | Goss | Mar. 5, 1935 |
| 2,027,386 | Krummer | Jan. 14, 1936 |
| 2,033,318 | Abramson | Mar. 10, 1936 |
| 2,039,292 | Burdick | May 5, 1936 |
| 2,079,069 | Johnson | May 4, 1937 |
| 2,204,791 | Davis | June 18, 1940 |

FOREIGN PATENTS

| Number | Country | Date |
|---|---|---|
| 107,622 | Great Britain | July 3, 1917 |